(12) United States Patent
Danner et al.

(10) Patent No.: US 8,896,433 B2
(45) Date of Patent: Nov. 25, 2014

(54) DRIVER ASSISTANCE SYSTEM AND METHOD FOR SUPPORTING THE DRIVER OF A VEHICLE IN MAINTAINING A TRAFFIC LANE LIMITED BY TRAFFIC LANE MARKINGS

(75) Inventors: Bernd Danner, Aichtal (DE); Uli Kolbe, Stuttgart (DE); Rainer Moebus, Stuttgart (DE); Markus Raab, Kirchhardt (DE); Uwe Regensburger, Ostfildern (DE); Reinhold Schoeb, Gaeufelden (DE); Ingo Dudeck, Weinstadt (DE); Anke Dorle Dudeck, legal representative, Weinstadt (DE); Lars Dudeck, legal representative, Weinstadt (DE); Sven Gerhard Dudeck, legal representative, Munich (DE)

(73) Assignee: Daimler AG, Stuttgart (DE)

( * ) Notice: Subject to any disclaimer, the term of this patent is extended or adjusted under 35 U.S.C. 154(b) by 890 days.

(21) Appl. No.: 12/864,335

(22) PCT Filed: Nov. 26, 2008

(86) PCT No.: PCT/EP2008/010007
§ 371 (c)(1),
(2), (4) Date: Apr. 21, 2011

(87) PCT Pub. No.: WO2009/092416
PCT Pub. Date: Jul. 30, 2009

(65) Prior Publication Data
US 2011/0234390 A1    Sep. 29, 2011

(30) Foreign Application Priority Data

Jan. 25, 2008   (DE) .................. 10 2008 005 999

(51) Int. Cl.
*B60Q 1/00* (2006.01)
*B62D 15/02* (2006.01)
*B60T 8/1755* (2006.01)

(52) U.S. Cl.
CPC ............ *B62D 15/025* (2013.01); *B60T 8/17557* (2013.01); *B62D 15/0265* (2013.01); *B60T 2201/08* (2013.01); *B60T 2201/082* (2013.01); *B60T 2201/083* (2013.01)
USPC ............ 340/438; 340/435; 340/436; 701/301

(58) Field of Classification Search
USPC ...................... 701/36, 41, 42, 43, 70, 93, 301; 340/438, 905, 425.5, 435, 436, 437
See application file for complete search history.

(56) References Cited

U.S. PATENT DOCUMENTS 6,256,561 B1 * 7/2001 Asanuma ...................... 701/41
7,620,497 B2 * 11/2009 Maass ........................... 701/301

(Continued)

FOREIGN PATENT DOCUMENTS

DE    694 02 278 T2    7/1997
EP    1 867 542 A1    12/2007

(Continued)

OTHER PUBLICATIONS

International Search Report (Form PCT/ISA/210) dated Mar. 17, 2009 with partial English translation, including Forms PCT/ISA/220 and PCT/ISA/237 (Fifteen (15) pages).

(Continued)

*Primary Examiner* — Brian Zimmerman
*Assistant Examiner* — Laura Nguyen
(74) *Attorney, Agent, or Firm* — Crowell & Moring LLP (57) ABSTRACT

In a method and apparatus for assisting the driver of a vehicle in maintaining a traffic lane limited by traffic lane markings, the traffic lane markings and the position of the vehicle in the traffic lane are detected. Upon an actual or impending change of traffic lanes a lane change warning is output to the driver of the vehicle in a first step, and a course correcting actuating intervention counteracting the lane change is carried out in a second step. The actuating intervention is carried out only if the change of traffic lanes is impermissible due to the type of traffic lane marking to be crossed during the traffic lane change, or if the lane change is not possible without danger due to collision-endangering objects present on the side of the traffic lane.

11 Claims, 4 Drawing Sheets

(56) References Cited

U.S. PATENT DOCUMENTS

| | | |
|---|---|---|
| 7,893,819 B2 * | 2/2011 | Pfeiffer et al. ............ 340/435 |
| 2005/0017857 A1 * | 1/2005 | Rao et al. ............ 340/435 |
| 2006/0152346 A1 * | 7/2006 | Maass et al. ............ 340/425.5 |
| 2007/0203617 A1 * | 8/2007 | Haug ............ 701/1 |
| 2008/0023254 A1 * | 1/2008 | Prost-Fin et al. ............ 180/400 |

FOREIGN PATENT DOCUMENTS

| | | |
|---|---|---|
| JP | 11-066494 | 3/1999 |
| JP | 2005-018211 A | 1/2005 |
| JP | 2005-310011 A | 11/2005 |
| JP | 2007-008281 A | 1/2007 |
| JP | 2007-296919 A | 11/2007 |
| JP | 2008-012989 A | 1/2008 |
| WO | WO 2005/118372 A1 | 12/2005 |
| WO | WO 2006/081936 A1 | 8/2006 |
| WO | WO 2007/145564 A1 | 12/2007 |

OTHER PUBLICATIONS

Notification of Reasons for Refusal in related Japanese Patent Application No. 2010-543383 dated Nov. 21, 2012.

* cited by examiner

DRIVER ASSISTANCE SYSTEM AND METHOD FOR SUPPORTING THE DRIVER OF A VEHICLE IN MAINTAINING A TRAFFIC LANE LIMITED BY TRAFFIC LANE MARKINGS

BACKGROUND AND SUMMARY OF THE INVENTION

This application is a national stage of PCT International Application No. PCT/EP2008/010007, filed Nov. 26, 2008, which claims priority under 35 U.S.C. §119 to German Patent Application No. 10 2008 005 999.4, filed Jan. 25, 2008, the entire disclosure of which is herein expressly incorporated by reference.

The invention relates to a driver assistance system and a method for assisting the driver of a vehicle in maintaining a traffic lane limited by traffic lane markings.

German patent document DE 694 02 278 T2 discloses a method of this general type, in which the course of a traffic lane used by a vehicle is detected by detecting traffic lane markings limiting the lane, and a steering torque is exerted on a steering system of the vehicle if it approaches one of the traffic lane markings, thereby assisting the driver in maintaining the traffic lane. If the traffic lane marking is subsequently crossed, the driver is informed by a haptic and acoustic warning. The environment of the vehicle is additionally monitored for collision-endangering objects with this method, and a lateral movement of the vehicle is prevented or inhibited, if collision-endangering obstacles are detected by the monitoring.

International patent document WO 2006/081936 A1 discloses a method for supporting the driver of a vehicle in maintaining a lane, in which the prospective deviation of the vehicle position from a nominal lane determined by means of traffic lane markings is determined and a supporting steering torque is generated when exceeding certain deviation thresholds, which supports the driver when guiding the vehicle back into the nominal lane. The deviation thresholds can thereby be varied in dependence on objects, which are detected in the driving direction of the vehicle laterally of the traffic lane driven on by the driver.

One object of the invention is to provide a driver assistance system and method of the above-mentioned type, for helping the driver of a vehicle to maintain a lane, wherein the supporting measures on the side of the system take place in such a manner that they are perceived by the driver as adequate and not as disturbing.

This and other objects and advantages are achieved by the driver assistance system according to the invention, which comprises a traffic lane recognition device for detecting a traffic lane driven on by the vehicle by means of lane-limiting traffic lane markings, a warning device for outputting a lane abandoning warning to a driver of the vehicle when recognizing a lane abandoning tendency, an object recognition device for detecting lateral objects which are present next to the detected traffic lane and a control device for carrying out a course correcting actuating intervention. The traffic lane recognition device is set up to recognize, based on the type of the traffic lane markings, whether a traffic lane change by passing over the traffic lane marking is permissible or impermissible; and the control device is set up to trigger an actuating intervention subsequent to the output of the lane abandoning warning when such a lane change is impermissible, or when there is a danger of collision with a detected lateral object.

According to the invention, therefore, support is offered to the driver in several escalation steps: in a first escalation step, a lane abandoning warning referring to the lane abandoning tendency is output and in a subsequent second escalation step, a course correcting actuating intervention acting against the lane abandoning tendency is carried out. The second escalation step is thereby only activated under the condition that the abandoning of the traffic lane is impermissible or is dangerous due to a possible collision with lateral objects. This means, in situations, in which the passing over the traffic lane marking is permissible and also possible without danger, the second escalation step is not activated and the course correcting actuating intervention is thus not carried out. In these situations it is assumed that the driver will deliberately want to leave the traffic lane and will perceive an actuating intervention acting against the lane abandoning as an inappropriate and unexpected system action, which would lead to acceptance problems with frequent occurrence.

The object recognition is preferably set up in such a manner that it can also detect objects that are in front in addition to lateral objects, which objects that are in front are within the traffic lane in front of the vehicle, and the control device is advantageously set up in such a manner that it suppresses the actuating intervention, if an evaluation of the situation results in that the danger of the collision with a detected front object is present.

It can be prevented in this manner that an evasion maneuver carried out by the driver for passing around an obstacle which is present in the driving path of the vehicle is prevented or hampered by the actuating intervention that takes place on the system side. The driver can thus evade a front object recognized as an obstacle and can thereby leave the traffic lane without a counter-reaction on the system side, even if an abandoning of the traffic lane would be impermissible.

The traffic lane recognition device is preferably set up to judge the abandoning of the traffic lane as permissible if the traffic lane marking that is being passed over is a broken line, and to judge it as impermissible if the traffic lane marking being passed over is a continuous line.

The control device is preferably arranged to carry out the actuating intervention by individual braking of individual wheels of the vehicle.

In an advantageous arrangement of the driver assistance system, the warning device is set out to output the lane abandoning warning in the form of steering wheel vibrations to the driver.

In a further advantageous arrangement of the driver assistance system, the object recognition device is set up to recognize standing and moving objects outside the traffic lane.

The control device is preferably set up to suppress the actuating intervention with a permissible abandoning of the traffic lane, if an area that is sufficiently large for a lane change is present next to the traffic lane.

The traffic lane recognition device is preferably designed as a video-based lane recognition system.

The object recognition device is preferably arranged as a radar system.

With the method according to the invention for supporting the driver of a vehicle in maintaining a traffic lane limited by traffic lane markings, the traffic lane markings and the position of the vehicle within the traffic lane are detected, the environment of the vehicle is sensed for the presence of collision-endangering lateral objects next to the traffic lane, and when abandoning or an impending abandoning of the traffic lane, a lane abandoning warning is output to the driver, and a course correcting actuating intervention acting against the lane abandoning is carried out. The course correcting actuating intervention is carried out chronologically after the output of the lane abandoning warning; the abandoning of the traffic lane by means of the type of the traffic lane marking to be passed over hereby is furthermore judged to be permissible or impermissible; and the course correcting actuating intervention is suppressed if the abandoning of the traffic lane has been judged to be permissible and no collision-endangering lateral objects have been recognized next to the traffic lane.

The environment of the vehicle is further examined for the presence of collision-endangering front objects which are in front of the vehicle within the traffic lane, and the course correcting actuating intervention is suppressed if such a collision-endangering front object is recognized a present.

The actuating intervention is thus suppressed in situations, in which one can assume that the driver abandons the traffic lane deliberately, in order to evade a collision-endangering object in front recognized as an obstacle.

The abandoning of the traffic lane is thereby preferably judged to be permissible if the traffic lane marking to be passed over when abandoning the lane is a broken line.

The abandoning of the traffic lane is preferably judged to be impermissible if the traffic lane marking to be passed over when abandoning the lane is a continuous line.

In an advantageous further development of the method, it is estimated how high the danger of a collision of the vehicle with one of the collision-endangering lateral objects is when abandoning the lane, and the actuating intervention is carried out in dependence on the estimated height of the danger.

In an advantageous further development, the lane abandoning warning is output as a haptic warning.

In a further advantageous further development of the invention, the course correcting actuating intervention is carried out as a single wheel brake intervention.

Other objects, advantages and novel features of the present invention will become apparent from the following detailed description of the invention when considered in conjunction with the accompanying drawings.

DETAILED DESCRIPTION OF THE DRAWINGS

Parts corresponding to each other are provided with the same reference numerals in all figures.

Figure 1:
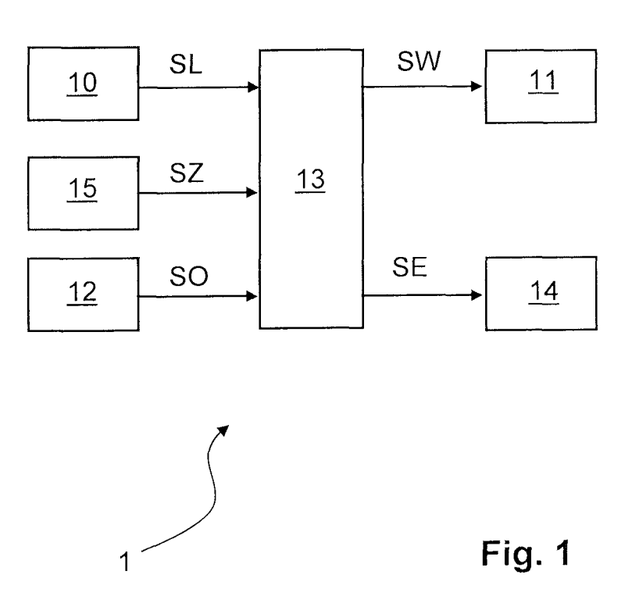
FIG. 1 is a block diagram of the driver assistance system according to the invention.

FIG. 1 shows a driver assistance system 1 for a vehicle, with a traffic lane recognition device 10, a warning device 11, an object recognition device 12, a control device 13, an actuating device 14 for controlling the lateral movement of the vehicle and a state detection device 15 for detecting the displacement state of the vehicle.

The traffic lane recognition device 10 may be a video-based recognition system, which records video images of a road section in front of the vehicle and uses image processing to recognize traffic lane markings that are applied to a road driven on by a vehicle for the traffic lane limiting. The device 10 determines the course of the traffic lane driven on by the vehicle and the position of the vehicle within the traffic lane by means of the recognized traffic lane markings. The traffic lane recognition device 10 further recognizes, by means of the type how traffic lane markings are designed, if it is permissible or impermissible to pass over these. Passing over a traffic lane marking is usually impermissible if it is designed as a continuous line, and permissible if it is designed as a broken line. With traffic lane markings designed as a double line, the type of the inner line is thereby relevant for the decision if it is permissible or impermissible to pass over these. The determined information regarding the course and the type of the traffic lane markings and with regard to the position of the vehicle in the traffic lane are passed to the control device 13 by the traffic lane recognition device 10 as lane information SL.

The object recognition device 12 is designed as a radar system, which has several radar sensors distributed at the vehicle, which are aligned to the front, the rear and to the sides of the vehicle, and which are suitable to detect standing and moving lateral and front objects that are present outside the traffic lane driven on by the vehicle immediately next to the vehicle, laterally in front of the vehicle and laterally behind the vehicle or in front of the vehicle within the traffic lane driven on by the driver. The object recognition device 12 is thereby in the position to recognize stationary obstacles outside the traffic lane being driven on, in particular guard railings or other constructions, plants and parking vehicles, but also vehicles which come close to the vehicle from an adjacent opposite traffic lane or which come close to the vehicle from behind on an adjacent lane and enter its dead angle. The object recognition device 12 is also in the position to recognize vehicles and stationary obstacles which are present in front of the vehicle within the traffic lane driven on by the vehicle.

The object recognition device 12 determines the distance and the speed of the lateral or objects in front and passes this information as object information SO to the control device 13.

The state sensing device 15 comprises sensors for determining the speed of the vehicle and of the steering angle or of the yaw angle of the vehicle and passes this information as state information to the control device 13.

The control device 13 determines by means of the lane information SL, the object information SO and the state information SZ, if a lane abandonment is present and outputs a warning signal SW to the warning device 11 if this is the case, which then outputs a traffic lane abandoning warning to the driver of the vehicle. The warning device 11 is advantageously designed as a haptic warning device, which effects a vibration at the steering wheel of the vehicle that can be sensed by the driver. An acoustic or optical warning can also be output to the driver as a further traffic lane abandoning warning.

The control device further determines by means of the lane information SL, the object information SO and the state information SZ if the lane abandoning tendency is further present subsequent to the output of the lane abandoning warning after a predefined reaction time. If this is the case, the driver has not reacted or not reacted sufficiently to the lane abandoning warning, and an actuating signal is then output to the actuating device 14, which controls the lateral displacement of the vehicle in the sense of a reduction of the lane abandoning tendency.

The actuating device 14 is designed as a brake control device in the present embodiment, which generates a yaw moment acting against the lane abandoning tendency by means of a defined single wheel braking. The actuating device 14 can additionally or alternatively also be formed as a steering control device, which exerts a steering torque acting against the lane abandoning tendency on a steering system of the vehicle.

The control device 13 is set up to suppress the actuating signal SE if certain intervention fading conditions are fulfilled. The details for this will be explained further by means of FIGS. 2 and 3.

Figure 2:
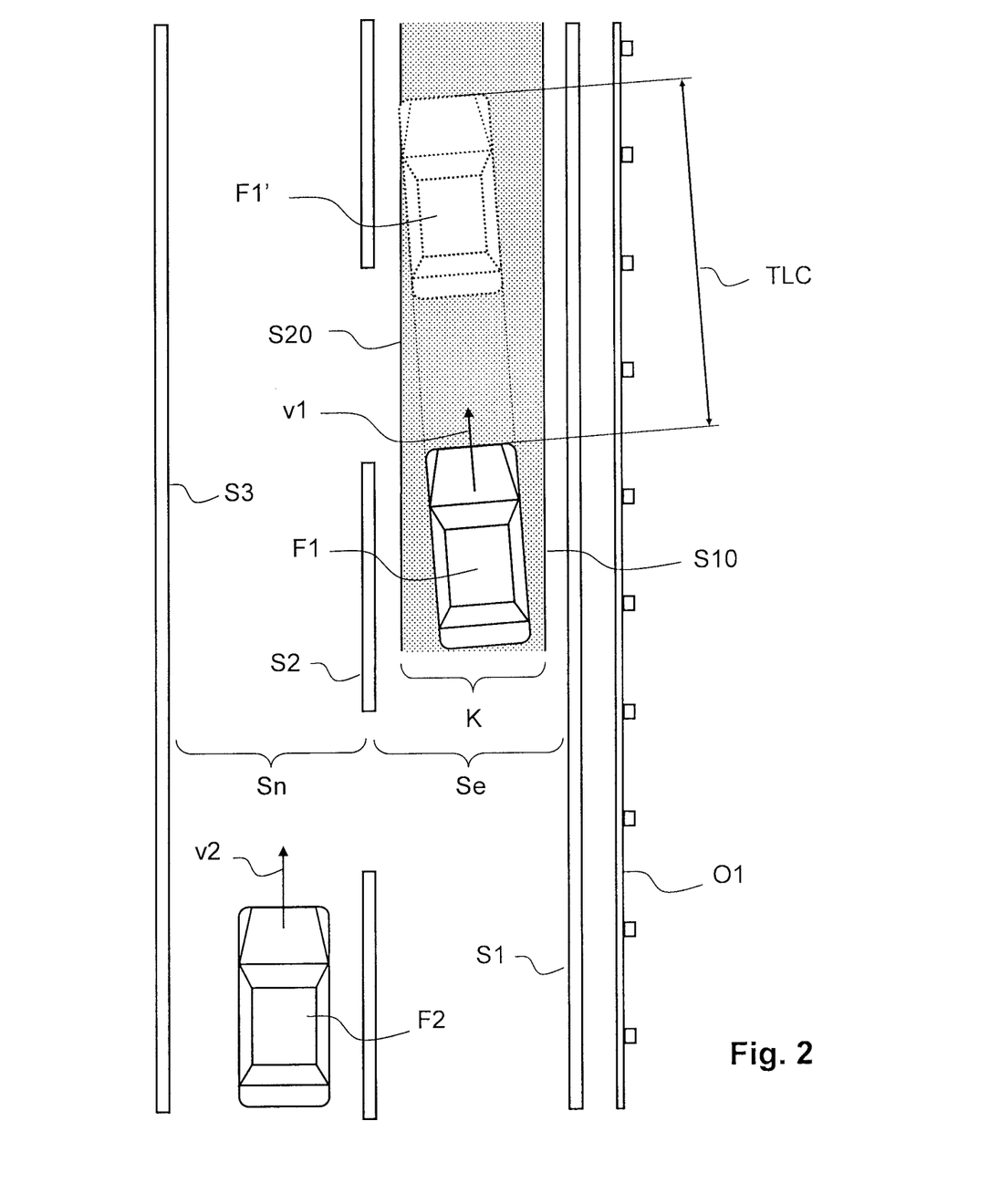
FIG. 2 shows a typical traffic situation on a two-lane road.

FIG. 2 shows a road with two traffic lanes Se, Sn limited by traffic lane markings S1, S2, S3 and with two vehicles F1, F2 driving in respectively one of the traffic lanes Se in a schematic depiction. The two outer traffic lane markings S1, S3 are designed as continuous lines and the center traffic lane marking S2 is designed as a broken line. Passing over of the outer traffic lane markings S1, S3 is thereby impermissible and a passing over of the center traffic lane marking S2 is permissible.

The vehicle F1 is equipped with the driver assistance system 1. It drives within the traffic lane Se, which is referred to as an own traffic lane, and is there within a driving path K which is limited by fictitious limiting lines S10, S20. The driving path K represents the desired space of the vehicle F1 with the own traffic lane Se. The limiting lines S10, S20 can be displaced in dependence on the speed and/or in dependence on a driver input, they can in particular be displaced in such a manner that they correspond with the positions of the lane markings S1, S2. The vehicle F1 moves with a speed v1 represented by an arrow.

The vehicle F2 is in the traffic lane Sn adjacent to the own traffic lane Se and approaches the vehicle 1 from behind. The speed v2 and the driving direction of the vehicle F2 is indicated by an arrow. The vehicle is in the sensing region of the object recognition device 12 and is detected thereby as a moving lateral object.

Next to the own traffic lane Se is a guard railing O1, which is detected by the object recognition device 12 as a standing lateral object.

Figure 3:
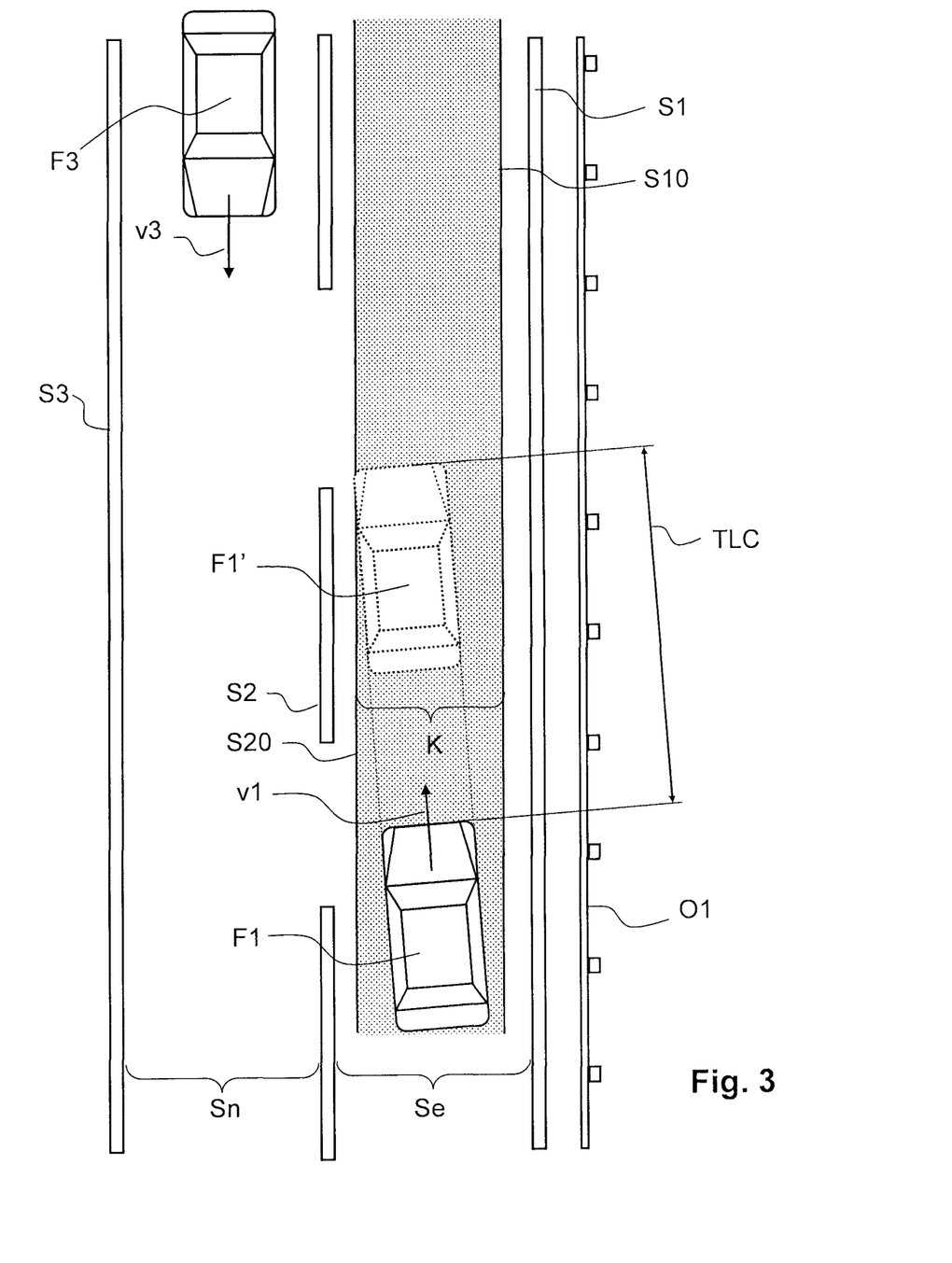
FIG. 3 shows a typical traffic situation on a road with oncoming traffic.

FIG. 3 also shows a road with two traffic lanes Se, Sn limited by traffic lane markings S1, S2, S3 and with two vehicles F1, F3 driving in respectively one of the traffic lanes Se,Sn in a schematic depiction. The vehicle F3 is in front of the vehicle F1 on the traffic lane Sn adjacent to the own traffic lane Se and drives in this traffic lane Sn with a speed v3 represented by an arrow.

Figure 4:
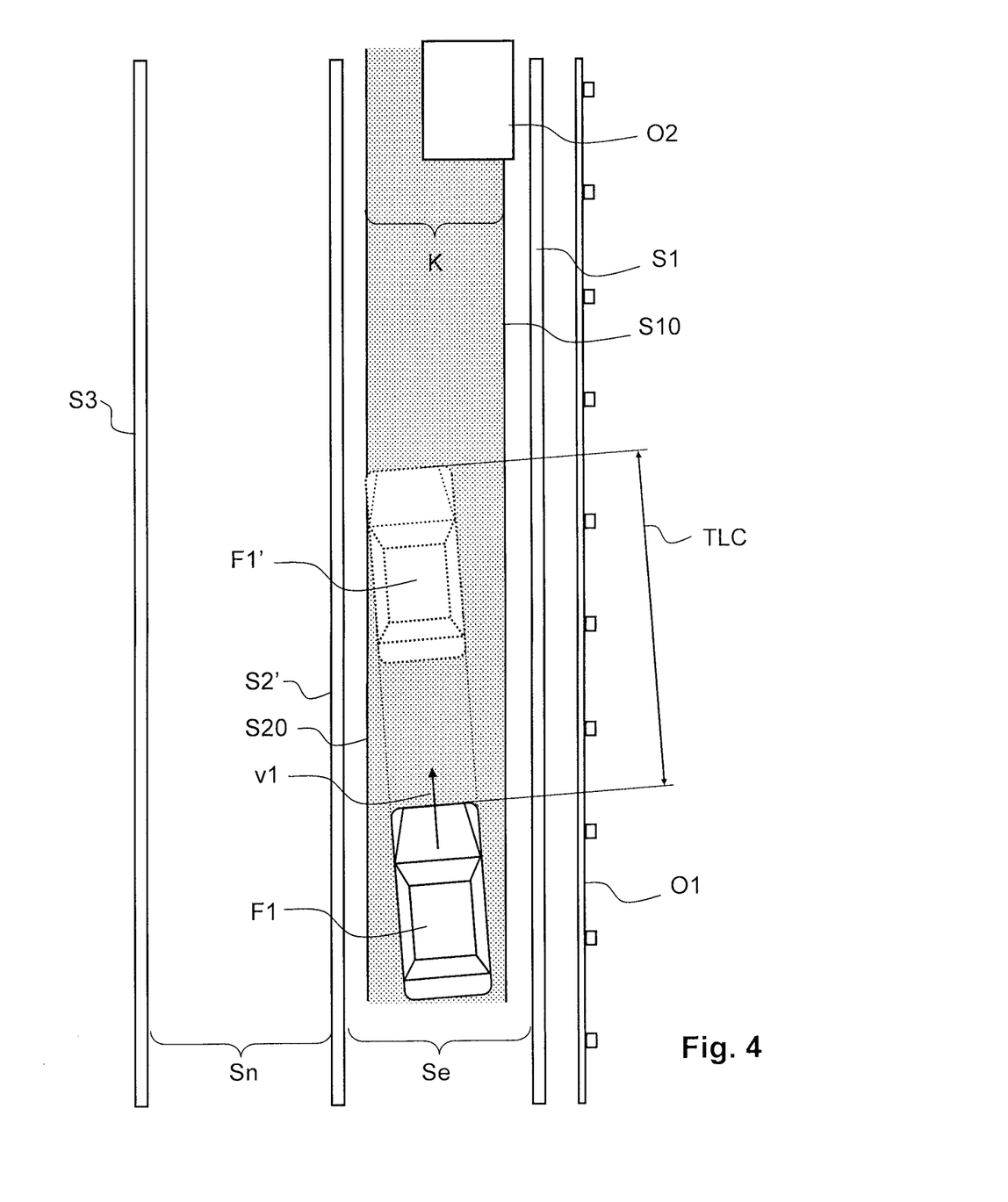
FIG. 4 shows a typical traffic situation on a road with an impermissible lane change.

FIG. 4 also shows a road with two traffic lanes Se, Sn limited by traffic lane markings S1, S2', S3 with the vehicle F1 driving in the traffic lane F1 and with an object O2 in front of the vehicle F1 in the traffic lane Se. The object O2 in front, for example a standing or slowly moving vehicle, is an obstacle for the vehicle F1, that is, a collision-endangering object, with which the vehicle F1 will probably collide within an anticipatory period, if no countermeasures are resorted to. The driver of the vehicle F1 wants to evade this collision-endangering object O2 in front and drive over the traffic lane marking S2' for this. The latter is designed as a continuous line, that is, a passing over the traffic lane S2' is impermissible. In such a case, only a lane abandoning warning shall be output, and an actuating intervention acting against the evasion maneuver shall be suppressed. This means that the driver will have the full responsibility for the handling of the dangerous situation caused by the object O2 in front.

The control device 13 carries out an evaluation of the situation by means of the provided object information SO, in order to determine if the sensed lateral objects F2, F3, O1 or objects O2 in front are collision-endangering objects, that is, to determine if the sensed lateral objects F2, F3, O1 represent a collision danger in the case that the vehicle F1 will leave the own traffic lane Se, or to determine if the sensed objects O2 in front represent a collision danger in the case that the vehicle F1 will not leave the own traffic lane Se.

The vehicle F2 nearing the vehicle F1 in the dead angle region is thus for example evaluated as a collision-endangering object if it is within a predefined distance region behind the vehicle F1 and draws nearer to the vehicle F1 with a high speed v2 (that is, with a speed v2 that is larger than the speed v1 of the vehicle F1 by a predefined threshold value). The oncoming vehicle F3 is evaluated as a collision-endangering object if its trajectory determined in an anticipatory manner crosses the trajectory of the vehicle F1, also determined in an anticipatory manner, in a position, which the two vehicles F1, F3 will reach simultaneously with an unchanged maintenance of their movement states. The guard railing O2 is correspondingly evaluated to be a collision-endangering object if the trajectory of the vehicle F1 will contact the guard railing O1.

If one of the lateral objects F2, F3, O1 is evaluated as a collision-endangering object, the control device 13 can additionally assign a danger measure to the respective object 13 which indicates the magnitude of the probability of the collision or the strength of the collision.

A sensed front object O2 is for example evaluated as a collision-endangering object if an evaluation of the situation by means of the distance and the relative speed between the vehicle F1 and the sensed front object O2 determines that a collision will result within a predefined period, if the vehicle F1 should be kept in the traffic lane Se with an unchanged relative speed, or that the time which remains as a maximum action period for the driver to just avoid a collision by initiating a collision-avoiding measure, in particular a full brake application or an evasion maneuver, is smaller than a predefined time threshold.

The control device 13 determines by means of the state information SZ, in particular by means of the speed v1 of the vehicle F1 and by means of a steering angle adjusted at a steering system of the vehicle F1 the trajectory of the vehicle F1 in an anticipatory manner for an anticipatory period or an anticipatory distance. This is a predicted displacement lane, along which the vehicle will move during the anticipatory period or until reaching the anticipatory distance. The control device 13 then determines a period TLC ((time to line crossing), which the vehicle will presumably need to leave the driving path K (that is, the period that the vehicle F1 will need to reach the position F' shown in dots, in which the limitation line S20 of the driving path K is passed over). This period is referred to as lane abandoning period TLC in the following.

The control device 13 subsequently compares the determined lane abandoning period TLC with a predefined time threshold. If the lane abandoning period TLC is smaller than the predefined time threshold, the control device 13 determines that the vehicle F1 has a tendency to abandon a lane and then outputs the lane abandoning warning in a first escalation step to the driver of the vehicle F1 via the warning device 11. The control device 13 further determines if the lane abandonment tendency within a predefined reaction time exists further after the output of the lane abandoning warning. If this is the case, the actuating signal SE is output to the actuating device 14, in order to move the vehicle F1 back into the driving path K by a course correcting actuating intervention carried out by the actuating device 14.

The actuating signal SE is advantageously generated in dependence of the danger measure assigned to the corresponding object in such a manner when determining a collision danger with one of the lateral objects, that the actuating intervention carried out by the actuating device 14 is carried out at a stronger measure with a high measure of danger and/or is initiated earlier than with a small measure of danger.

An adaptation of the actuating intervention to the criticality of the traffic situation resulting when abandoning the lane is thus obtained. An adaptation of the actuating intervention to the criticality of the traffic situation resulting when abandoning the lane is obtained thereby.

The output of the actuating signal SE is however suppressed if the following intervention fade-out conditions are fulfilled:

a) the control device 13 has obtained the information from the traffic lane recognition device 10 that a passing of the corresponding traffic lane marking S2 is permissible, that is, that the traffic lane marking S2—as shown in FIGS. 2 and 3—is designed as a broken line, and the control device 13 has additionally determined in advance by means of the conducted evaluation of the situation that a collision danger with one of the sensed lateral objects F2, F3, O1 does not exist when abandoning the lane, or b) the control device 13 has determined in advance by means of the conducted evaluation of the situation that the danger of a collision with a detected object O2 in front exists when maintaining the vehicle F1 in the traffic lane Se.

The condition for the triggering of the second escalation step is thus the previous output of the lane abandoning warning in the first escalation step and the determination that an abandoning of the traffic lane Se due to the type of the design of the traffic lane marking S1, S2 to be driven over is hereby impermissible or that the danger of a collision with one of the sensed standing or moving lateral objects F1, F3, O1 cannot be excluded with a permissible abandoning of the traffic lane Se, as additionally the determination that the danger of a collision with a sensed standing or moving object O2 in front does not exist.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A driver assistance system for a vehicle, said system comprising:
    a traffic lane recognition device for detecting a traffic lane driven on by a vehicle, based on lane-limiting traffic lane markings, wherein the traffic lane recognition device is configured to recognize, based on a type of the traffic lane markings, whether an abandonment of the traffic lane by passing over the particular traffic lane marking is permissible or impermissible;
    a warning device for outputting a lane abandoning warning to a driver of the vehicle when a lane abandoning tendency is detected;
    an object recognition device for detecting lateral objects that are present next to the sensed traffic lane and front objects present forward of the vehicle; and
    a control device for carrying out a course correcting actuating intervention; wherein,
    the control device is configured to trigger the actuating intervention subsequent to the output of the lane abandoning warning;
    the control device determines whether to trigger the actuating intervention based on whether (1) an abandoning of the traffic lane is impermissible, (2) a danger of a collision with a detected lateral object exists, and (3) a danger of a collision with a detected front object exists;
    the actuating intervention is triggered chronologically after the output of the lane abandonment warning when (a) abandoning of the traffic lane is impermissible, (b) the danger of a collision with a detected front object does not exist, and (c) the danger of a collision with a detected lateral object does not exist;
    the actuating intervention is triggered chronologically after the output of the lane abandonment warning when abandoning of the traffic lane is permissible and the danger of a collision with a detected lateral object exists;
    the actuating intervention is suppressed chronologically after the output of the lane abandonment warning when abandoning of the traffic lane is impermissible and the danger of a collision with a detected front object exists;
    the actuating intervention is suppressed chronologically after the output of the lane abandonment warning when abandoning of the traffic lane is permissible and (1) the danger of a collision with a detected front object does not exist and (2) the danger of collision with a detected lateral object does not exist;
    the traffic lane recognition device is configured to judge an abandoning of the traffic lane as permissible if the traffic lane marking that will be passed over is a broken line, and to judge it as impermissible if the traffic lane marking that will be passed over is a continuous line; and
    the danger of collision with a detected front or lateral object exists when there is a probability that the vehicle will collide with the detected front or lateral object within an anticipatory period if the vehicle continues along its current course and no countermeasures are performed.

2. The driver assistance system according to claim 1, wherein the control device is configured to carry out the actuating intervention by individual braking of single wheels of the vehicle.

3. The driver assistance system according to claim 1, wherein the warning device is configured to output the lane abandoning warning in the form of steering wheel vibrations to the driver.

4. The driver assistance system according to claim 1, wherein the object recognition device is configured to recognize standing and moving objects outside and inside the traffic lane.

5. The driver assistance system according to claim 1, wherein the control device is configured to suppress actuating intervention with a permissible abandoning of the traffic lane, if an area is present that is sufficiently large for a lane change.

6. The driver assistance system according to claim 1, wherein the traffic lane recognition device is designed as a video-based lane recognition system.

7. The driver assistance system according to claim 1, wherein the object recognition device is designed as a radar system.

8. A method for assisting the driver of a vehicle in maintaining a traffic lane that is limited by traffic lane markings, said method comprising:
    detecting the traffic lane markings and the position of the vehicle within the traffic lane;
    determining, based on the detected traffic lane markings and the position of the vehicle whether the traffic lane is being abandoned or about to be abandoned;
    sensing the environment of the vehicle for presence of collision-endangering objects next to the traffic lane and in front of the vehicle in the traffic lane;

outputting, in a first escalation step, a lane abandonment warning to a vehicle operator when it is determined that the traffic lane is being abandoned or about to be abandoned;

determining whether the abandoning of the traffic lane is permissible or impermissible based on the type of traffic lane marking that is to be crossed over;

determining whether to trigger or suppress a course correcting actuating intervention as a second escalation step, which is performed chronologically after the output of the lane abandonment warning, based on whether (1) the abandoning of the traffic lane has been determined to be permissible, (2) no collision-endangering objects are present next to the traffic lane, and (3) no collision endangering objects are present in front of the vehicle in the traffic lane, wherein the course correcting actuating intervention is triggered chronologically after the output of the lane abandonment warning when (a) abandoning of the traffic lane is impermissible, (b) no collision-endangering objects are in front of the vehicle in the traffic lane, and (c) no collision-endangering objects are present next to the traffic lane, wherein the course correcting actuating intervention is triggered chronologically after the output of the lane abandonment warning when abandoning of the traffic lane is permissible and a collision endangering object is present next to the traffic lane, wherein the course correcting actuating intervention is suppressed chronologically after the output of the lane abandonment warning when abandoning of the traffic lane is impermissible and a collision endangering object is present in front of the vehicle in the traffic lane, wherein the course correcting actuating intervention is suppressed chronologically after the output of the lane abandonment warning when abandoning of the traffic lane is permissible and (1) no collision endangering objects are present in front of the vehicle in the traffic lane and (2) no collision endangering objects are present next to the traffic lane, wherein abandonment of the traffic lane is judged to be permissible if the traffic lane marking that will be passed over when abandoning the lane is a broken line, and abandonment of the traffic lane is judged as impermissible if the traffic lane marking that will be passed over is a continuous line, and wherein a collision endangering-object that next to the traffic lane or in front of the vehicle in the traffic lane is an object for which there is a probability that the vehicle will collide with the object next to the traffic lane or in front of the vehicle in the traffic lane within an anticipatory period if the vehicle continues along its current course and no countermeasures are performed.

9. The method according to claim 8, wherein:

the magnitude of the danger that a collision of the vehicle with one of the collision-endangering objects is estimated; and the actuating intervention is carried out depending on the estimated magnitude of the danger.

10. The method according to claim 8, wherein the lane abandoning warning is output as a haptic warning.

11. The method according to claim 8, wherein the course correcting actuating intervention is carried out as a single wheel brake intervention.

* * * * *